(12) United States Patent
Bienick

(10) Patent No.: US 7,434,951 B2
(45) Date of Patent: Oct. 14, 2008

(54) ILLUMINATED SHELF

(75) Inventor: Craig Bienick, Jenison, MI (US)

(73) Assignee: Gemtron Corporation, Sweetwater, TN (US)

( * ) Notice: Subject to any disclaimer, the term of this patent is extended or adjusted under 35 U.S.C. 154(b) by 80 days.

(21) Appl. No.: 11/649,259

(22) Filed: Jan. 4, 2007

(65) Prior Publication Data

US 2007/0109764 A1 May 17, 2007

Related U.S. Application Data

(62) Division of application No. 10/602,863, filed on Jun. 25, 2003, now Pat. No. 7,163,305.

(51) Int. Cl.
*F21V 33/00* (2006.01)
(52) U.S. Cl. .......................................... 362/92; 362/133
(58) Field of Classification Search .................. 362/602, 362/605, 606, 608, 609, 610, 611, 612, 613, 362/614, 615, 551, 555, 559, 565, 33, 127, 362/133, 225, 240, 800, 812; 312/408, 112, 312/117, 116, 140, 122, 223.5
See application file for complete search history.

(56) References Cited

U.S. PATENT DOCUMENTS

| 3,197,902 A | 8/1965 | Buzan |
|---|---|---|
| 3,506,325 A | 4/1970 | Horvay |
| 3,612,848 A | 10/1971 | Koch et al. |
| 3,662,381 A | 5/1972 | Steffens |
| 3,737,651 A | 6/1973 | Shute |
| 3,754,243 A | 8/1973 | Kaneko et al. |
| 4,039,894 A | 8/1977 | Gardner, III |
| 4,112,485 A | 9/1978 | Sutter |
| 4,249,231 A | 2/1981 | Decaus |
| 4,597,035 A | 6/1986 | Lettenmeyer |
| 4,689,726 A | 8/1987 | Kretzschmar |
| 4,748,546 A | 5/1988 | Ukrainsky |
| 4,929,866 A | 5/1990 | Murata et al. |
| 4,939,625 A | 7/1990 | Olson |
| 5,034,861 A | 7/1991 | Sklenak et al. |
| 5,163,748 A | 11/1992 | Messinger |
| 5,287,252 A | 2/1994 | Caruso |
| 5,301,090 A | 4/1994 | Hed |
| 5,309,544 A | 5/1994 | Saxe |
| 5,325,271 A | 6/1994 | Hutchisson |
| 5,353,441 A | 10/1994 | Lazorchak |
| 5,359,503 A | 10/1994 | Myodo et al. |
| 5,369,555 A | 11/1994 | McKain et al. |
| 5,450,297 A | 9/1995 | Akashi et al. |

(Continued)

FOREIGN PATENT DOCUMENTS

EP 970642 A1 1/2000

(Continued)

*Primary Examiner*—Hargobind S Sawhney
(74) *Attorney, Agent, or Firm*—Diller, Ramik & Wight

(57) ABSTRACT

An illuminated shelf includes a tempered transparent glass panel having edges each housed in a slot of a housing defining a chamber through which and/or in which light is generated to illuminate the transparent panel. Each housing is preferably snap-secured together to access the chamber interior for purposes of replacement and/or repair. Each housing can be totally or partially encapsulated and the encapsulation includes conductors which are operative in any position of vertical adjustment or sliding adjustment of the shelf.

20 Claims, 9 Drawing Sheets

U.S. PATENT DOCUMENTS

| | | | |
|---|---|---|---|
| 5,460,275 A | 10/1995 | Ladwig | |
| 5,502,623 A | 3/1996 | Brotz | |
| 5,590,945 A | 1/1997 | Simms | |
| 5,608,550 A | 3/1997 | Epstein et al. | |
| 5,613,751 A | 3/1997 | Parker et al. | |
| 5,618,096 A | 4/1997 | Parker et al. | |
| 5,626,084 A | 5/1997 | Kelly et al. | |
| 5,656,014 A | 8/1997 | Rooney et al. | |
| 5,735,589 A * | 4/1998 | Herrmann et al. | 312/408 |
| 5,774,199 A | 6/1998 | Ozawa | |
| 5,786,665 A | 7/1998 | Ohtuski et al. | |
| 5,876,107 A | 3/1999 | Parker et al. | |
| 5,894,539 A | 4/1999 | Epstein | |
| 5,895,111 A | 4/1999 | Santosuosso et al | |
| 5,897,201 A | 4/1999 | Simon | |
| 5,898,814 A | 4/1999 | Yamamoto | |
| 5,902,034 A | 5/1999 | Santosuosso et al. | |
| 5,915,824 A | 6/1999 | Straat | |
| 5,921,652 A | 7/1999 | Parker et al. | |
| 5,980,058 A | 11/1999 | Guess et al. | |
| 5,987,199 A | 11/1999 | Zarian et al. | |
| 6,012,820 A | 1/2000 | Weber et al. | |
| 6,027,235 A | 2/2000 | Chen | |
| 6,030,108 A | 2/2000 | Ishiharada et al. | |
| 6,042,244 A | 3/2000 | Witkoski | |
| 6,076,950 A | 6/2000 | Topping et al | |
| 6,079,838 A | 6/2000 | Parker | |
| 6,080,105 A | 6/2000 | Spears | |
| 6,135,620 A | 10/2000 | Bienick | |
| 6,139,172 A | 10/2000 | Bos et al. | |
| 6,152,575 A | 11/2000 | Montanino | |
| 6,179,434 B1 * | 1/2001 | Saraiji | 362/125 |
| 6,184,628 B1 | 2/2001 | Ruthenberg | |
| 6,203,180 B1 | 3/2001 | Fleischmann | |
| 6,210,013 B1 | 4/2001 | Bousfield | |
| 6,213,622 B1 | 4/2001 | Shimada et al. | |
| 6,217,188 B1 | 4/2001 | Wainwright et al. | |
| 6,231,205 B1 | 5/2001 | Slesinger et al. | |
| 6,234,648 B1 | 5/2001 | Borner et al. | |
| 6,250,774 B1 | 6/2001 | Begemann et al. | |
| 6,255,786 B1 | 7/2001 | Yen | |
| 6,280,053 B1 | 8/2001 | Chien | |
| 6,282,821 B1 | 9/2001 | Freier et al. | |
| 6,283,608 B1 | 9/2001 | Straat | |
| 6,283,612 B1 | 9/2001 | Hunter | |
| 6,289,150 B1 | 9/2001 | Zarian et al. | |
| 6,292,901 B1 | 9/2001 | Lys et al. | |
| 6,297,906 B1 | 10/2001 | Allen et al. | |
| 6,335,999 B1 | 1/2002 | Winston et al. | |
| 6,347,874 B1 | 2/2002 | Boyd et al. | |
| 6,379,016 B1 | 4/2002 | Boyd et al. | |
| 6,679,573 B2 | 1/2004 | Bienick | |
| 6,729,704 B2 * | 5/2004 | Ames | 312/408 |
| 6,976,598 B2 * | 12/2005 | Engel | 211/187 |
| 2001/0008464 A1 | 7/2001 | Ouderkirk et al. | |
| 2001/0021445 A1 | 9/2001 | Weber et al. | |
| 2002/0034823 A1 | 3/2002 | Kuepper et al. | |
| 2003/0038571 A1 | 2/2003 | Obrock et al. | |

FOREIGN PATENT DOCUMENTS

| | | |
|---|---|---|
| EP | 1076215 | 2/2001 |
| EP | 1222775 A1 | 7/2002 |
| JP | 04180713 A * | 6/1992 |
| WO | WO 9530979 A1 | 1/1995 |

* cited by examiner

FIG. 13
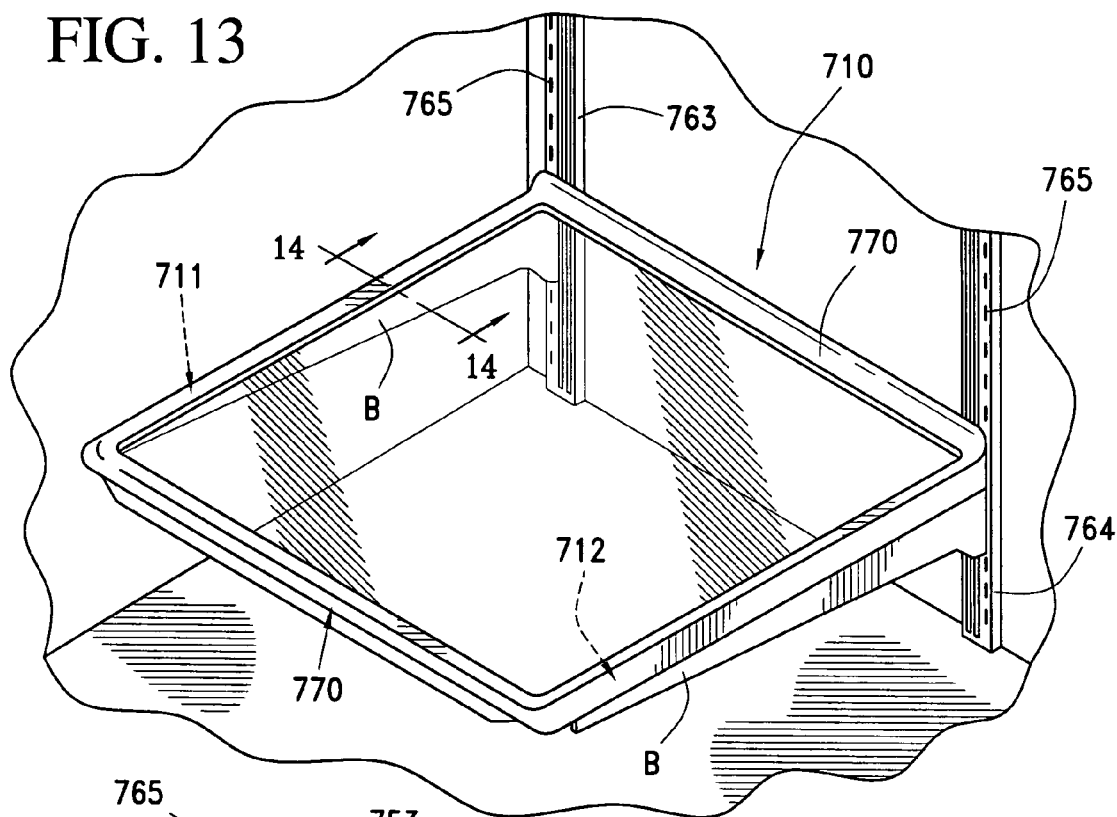
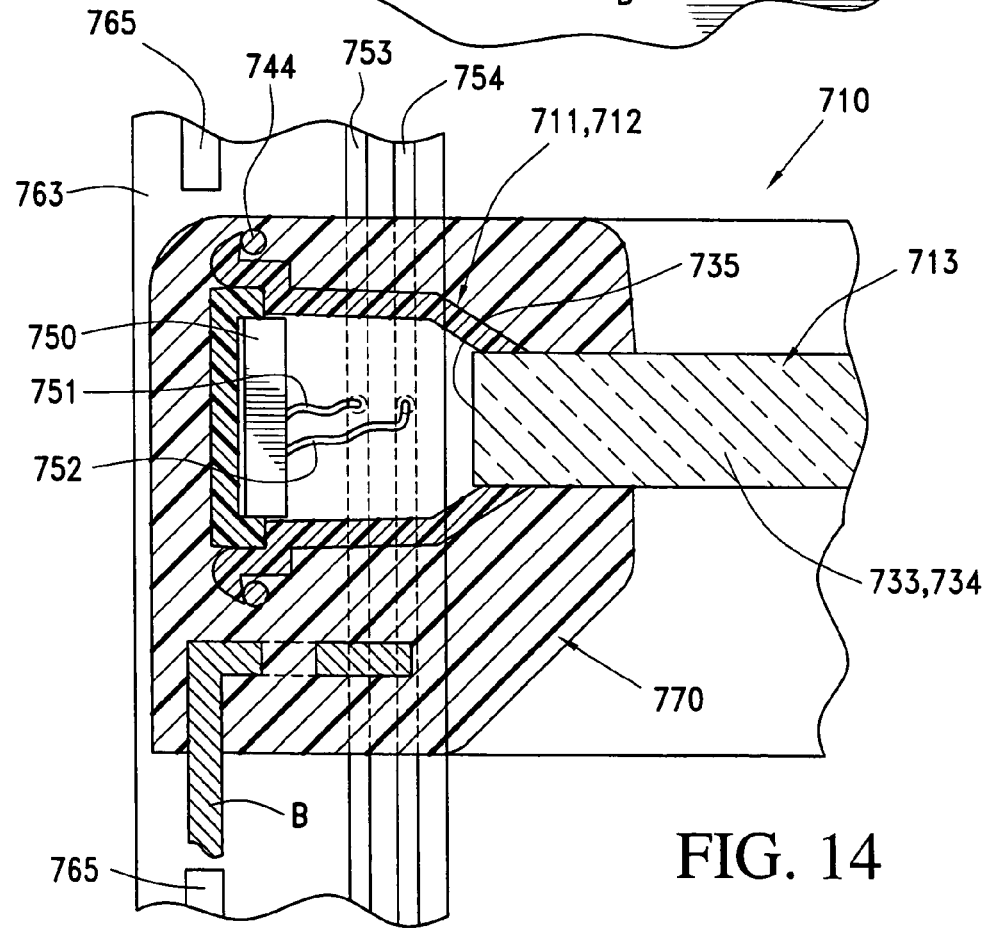
FIG. 14

ILLUMINATED SHELF

CROSS-REFERENCE TO RELATED APPLICATIONS

This Application is a divisional application of U.S. patent application Ser. No. 10/602,863 filed on Jun. 25, 2003 and now U.S. Pat. No. 7,163,305.

BACKGROUND OF THE INVENTION

The invention relates to shelving in general and specifically to an illuminated refrigerator shelf and a method of manufacture thereof.

Patent Application Publication No. U.S. 2003/0038571 A1 which published on Feb. 27, 2003 in the name of Thomas W. Obrock et al. discloses the closest prior art known to the applicant which includes a refrigerator shelf having side edge lighting. The shelf of FIGS. 7 through 14 and particularly FIGS. 10 through 14 includes a flat plate of light transmitting material, such as tempered glass, having along each of side edges thereof an end cap with each end cap carrying a plurality of spaced lights or bulbs which are appropriately connected to a 12 volt electrical current source for edge-illuminating the glass plate. Each of the end caps can carry a cantilever beam which is actually a shelf bracket having hooks for vertically adjusting the cantilever shelf relative to conventional slotted tracks of a refrigerator compartment. This patent specifically discloses that an upper edge of the cantilevered beams or shelf brackets can be secured to the end caps by molding, gluing, friction fitting, encapsulating or any other suitable attachment means. Utilizing appropriate conductors projecting from the end caps which mate with female electrical conductors of the tracks, the cantilevered shelf can be illuminated in a variety of different positions of vertical adjustment. The lifetime of the lights associated with the illuminated shelf is designed to be approximately 1,000 hours which, assuming being lit only a few minutes each day when the refrigerator door is open, might allegedly exceed the life of the refrigerator itself. However, the latter expectation does not account for the possibility of power surges which could burn all the lights out, liquid leakage from products which would create a short to likewise create a short and prevent any illumination whatever, a broken wire between lights, etc. As a matter of fact, front and rear edges of the tempered glass plate are turned up to form a spillage-containment volume with the associated end caps, but should sealant, bonding, encapsulation or the like include voids or fissures or deteriorate to provide such product, liquid spillage would readily enter the end caps causing a short and thereby reduce the life and effectiveness of the illuminated shelf.

SUMMARY OF THE INVENTION

The present invention is directed to an illumination device and particularly an illuminated shelf which includes a transparent light transmitting tempered glass panel, opposite side housings, and each side housing being constructed from two housing parts which can be readily assembled and disassembled to access a compartment housing illumination devices, such as a light pipe, LED's, etc. The side housings each have a slot which receives an edge of the tempered glass panel and each housing further includes means for securing the shelf to an associated support, such as the interior of a refrigerator compartment. By providing a housing which can be readily opened and closed, any problems associated with lighting within each chamber defined by each housing can be analyzed, repaired, and the shelf replaced with a minimum of time, effort and cost.

Each side housing is preferably formed of two relatively long housing bodies with one housing body being provided with the slot to accommodate an edge portion of an associated tempered glass panel. The other housing body is preferably provided with integral fastening means for securing the same to an interior of a refrigerator compartment. Male and female snap-securing or coupling means are carried by the housing bodies to facilitate the rapid attachment and detachment thereof to each other.

In further accordance with this invention, the entirety of the housing and a portion of the tempered glass panel can be encapsulated by the synthetic polymeric/copolymeric material, though preferably at least one axial end of the housing is not encapsulated. The non-encapsulated end of the housing can be thereby utilized to gain access to the interior of a chamber defined by the housing within which is housed, for example, a light pipe, a fiber optic light pipe, LED's, a LED circuit board, etc., to facilitate repair of the latter components should the same fail over extended use.

In lieu of exposing an axial end of the housing, only a longitudinal portion of the housing body adjacent the tempered glass panel edge portion and the edge portion itself are encapsulated which leaves unencapsulated the remaining housing body and the snap-connectors of both housing bodies which similarly facilitate assembly and disassembly to gain access to a chamber of the housing within which are located an appropriate illuminating device.

In further accordance with the present invention, the tempered glass panel can be illuminated from above or below, as opposed to through side edges thereof. In one case light is directed toward an underside or toward a top side of the tempered glass panel, thereby illuminating the latter, and light rays respectively reflecting and transmitting therethrough further illuminate the interior compartment of an associated refrigerator. The light can instead be directed away from the tempered glass panel, either in a direction below the same or above the same to respectively illuminate products upon lower and upper shelves, in the latter case through a transparent tempered glass panel of an upper shelf through which the light rays pass.

In further accordance with the present invention, the illuminated shelf may also be a sliding shelf with appropriate conductors maintaining an electrical circuit between a 12 volt step-down transformer and the illuminating means of the sliding shelf to effect illumination thereof irrespective of the position of relative sliding adjustment.

With the above and other objects in view that will hereinafter appear, the nature of the invention will be more clearly understood by reference to the following detailed description, the appended claims and the several views illustrated in the accompanying drawings.

BRIEF DESCRIPTION OF THE DRAWINGS

FIG. 13 is a fragmentary perspective view of another illuminated shelf, and illustrates the shelf in association with tracks of a refrigerator compartment.

FIG. 14 is an enlarged fragmentary cross-sectional view taken generally along line 14-14 of FIG. 13, and illustrates one of two metal shelf brackets for cantilever supporting the illuminated shelf relative to the compartment tracks with an encapsulation unitizing each bracket two-piece housing and an edge portion of a piece of tempered glass.

DESCRIPTION OF THE PREFERRED EMBODIMENTS

Figure 1:
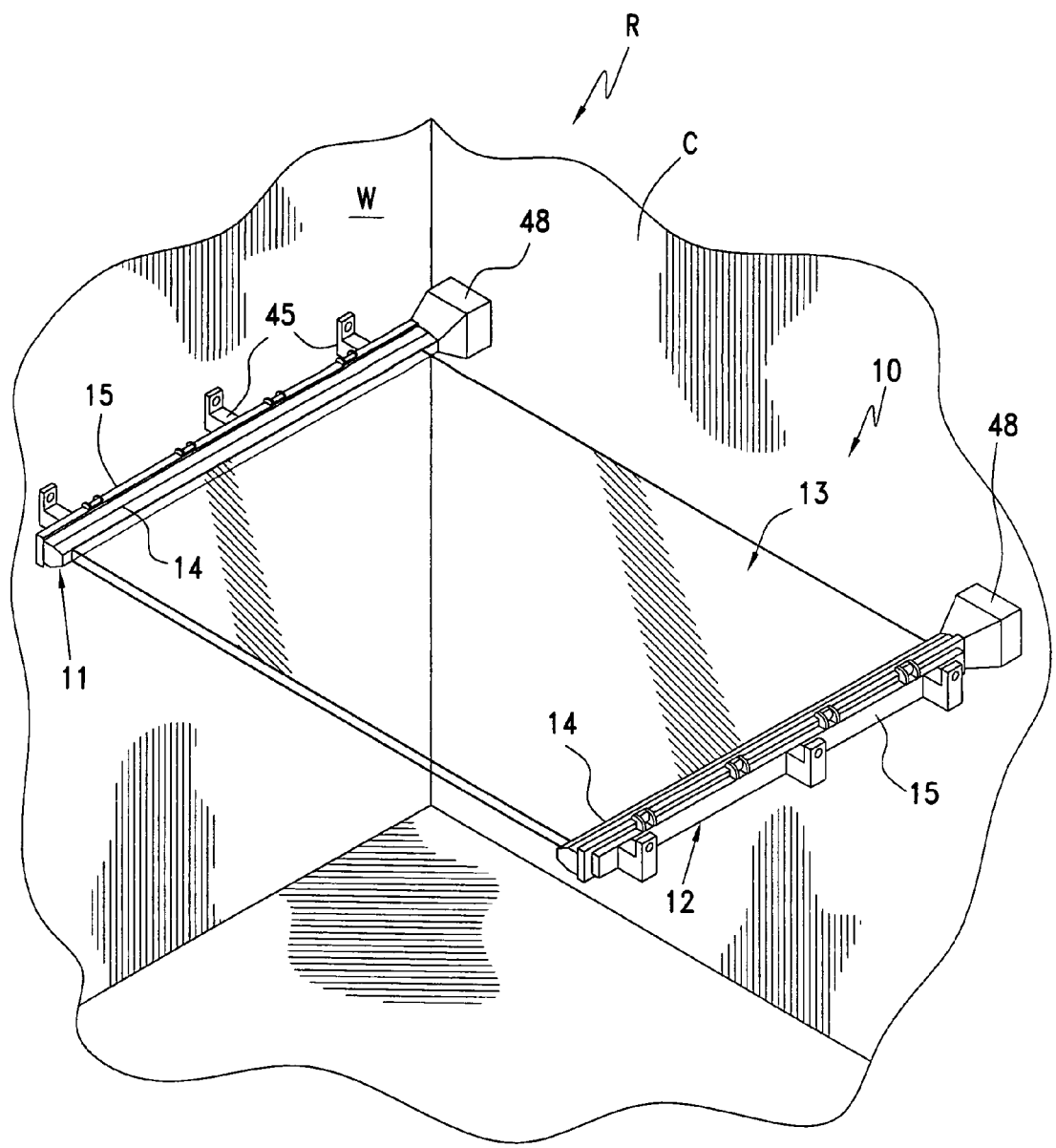
FIG. 1 is a fragmentary perspective view of an illumination device, such as an illuminated shelf, and illustrates the illuminated shelf housed in a compartment of a refrigerator.
Figure 2:
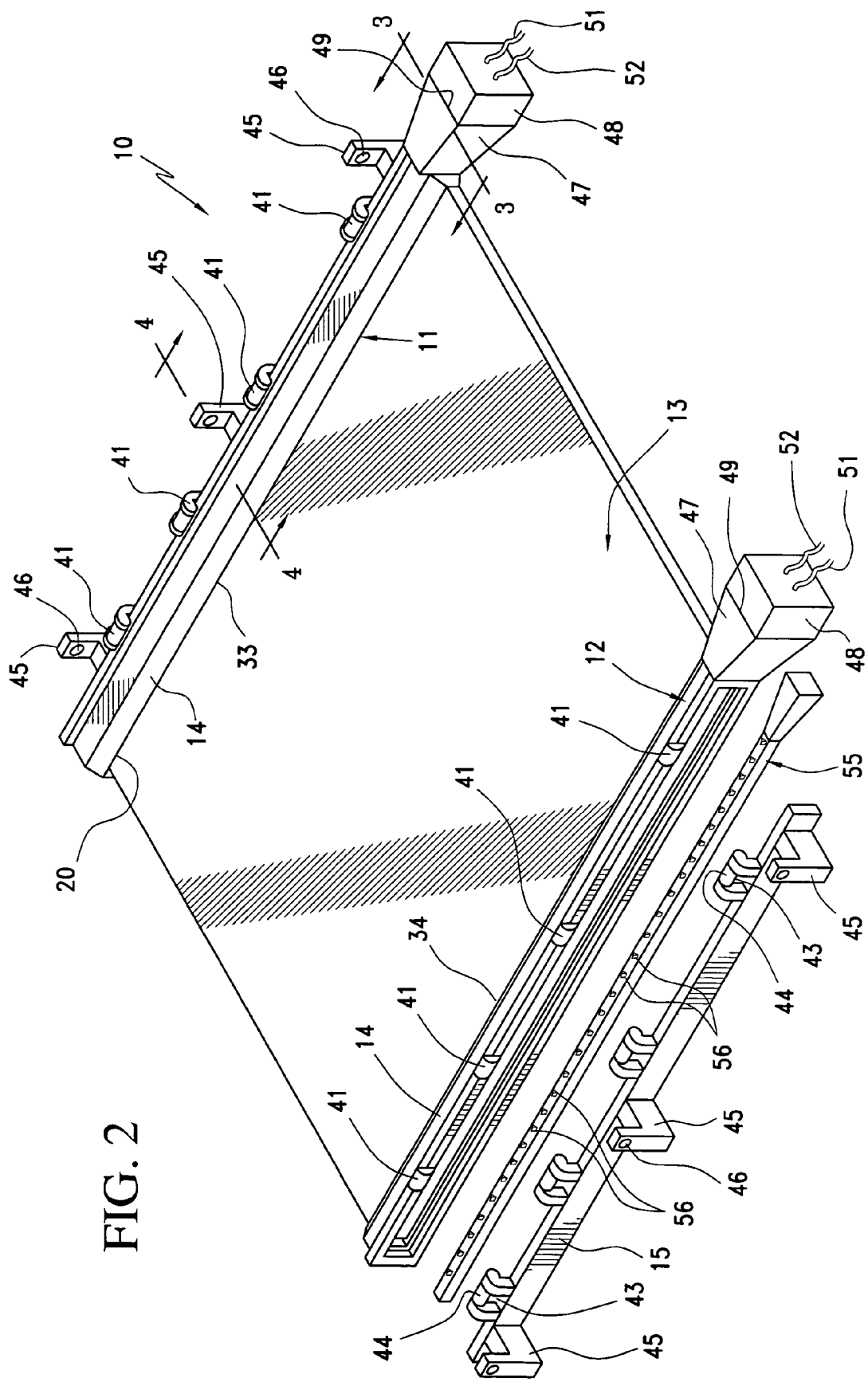
FIG. 2 is a perspective view of the illuminated shelf of FIG. 1 with parts broken away for clarity, and illustrates details of the illuminated shelf including opposite side housings each having a slot receiving an edge of a light-transmitting transparent panel, a light pipe and one of the housings disassembled.
Figure 3:
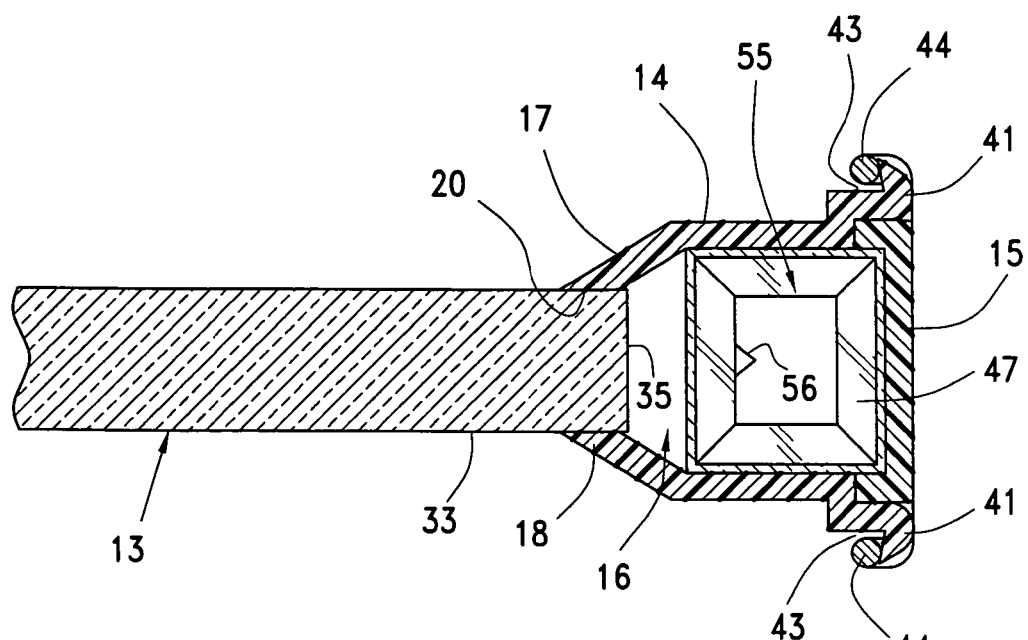
FIG. 3 is a fragmentary enlarged cross-sectional view taken generally along 3-3 of FIG. 1, and illustrates the manner in which an edge of the light-transmitting tempered glass panel is exposed to light rays emitted from a transparent light tube located within the side housing of the shelf.

A novel illumination device constructed in accordance with this invention, which is preferably in the form of a shelf, is illustrated in FIGS. 1 through 3 of the drawings, and is generally designated by the reference numeral 10.

The shelf 10 is preferably associated with a compartment C of a refrigerator R, as is best illustrated in FIG. 1 of the drawings. However, the shelf 10 can easily be utilized in other structures, such as retail store display cases, furniture cabinetry (dish display cases), utility shelves for workshops, wash rooms, etc. No matter the particular utilization of the shelves of this invention, each of the various shelves disclosed herein is designed to be illuminated directly or indirectly to thereby better illuminate articles or products supported upon, above or below the shelves to aid consumer selection thereof.

The shelf 10 includes two substantially identical housings 11, 12 which house therebetween a plate, panel or member of light-transmitting material, such as tempered glass, which is designated by the reference numeral 13.

Figure 4:
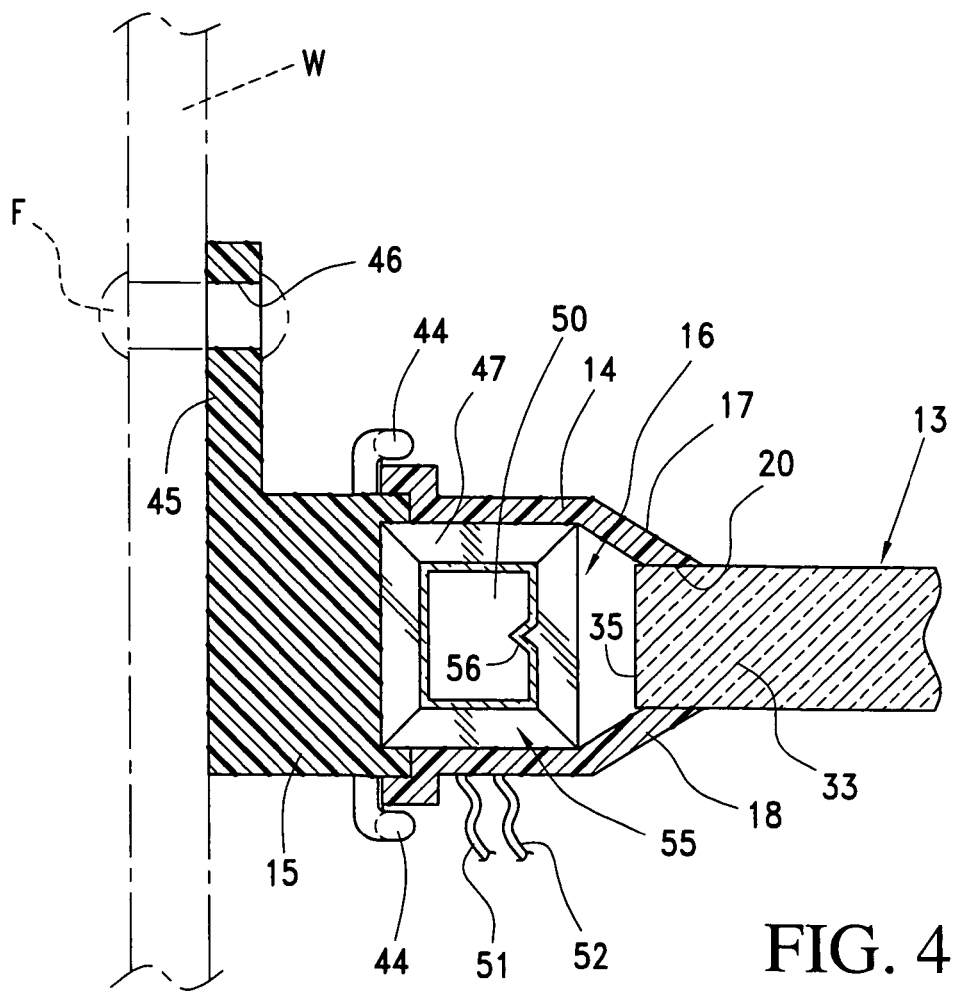
FIG. 4 is a fragmentary enlarged cross-sectional view taken generally along line 4-4 of FIG. 2, and illustrates one of the housing bodies or parts secured to a wall of the refrigerator compartment and snapped-secured to the other housing part.

Each housing 11, 12 includes adjacent, inboard opposing housing bodies, members or parts 14, 14 and remote complementary housing bodies, members or parts 15, 15. The housing bodies 14, 14; 15, 15 of each of the housings 11, 12 cooperatively define an internal chamber 16 (FIGS. 3 and 4) which over a major portion thereof is of a generally uniform polygonal or square configuration which merges through upper and lower converging walls 17, 18 with an elongated slot or opening 20 in which is slidably housed an elongated side edge or side edge portion 33, 34 of the glass panel 13 with a terminal end edge 35 (FIGS. 3 and 4) of the panel 13 being fully exposed to the interior of the chamber 16.

The housing bodies 14 of each of the housings 11, 12 include four pair of upwardly and downwardly directed hooks 41, 42, respectively, which removably snappingly secure into respective openings 43 and over cross bars 44 (FIGS. 2 through 4) of the outermost housing bodies 15 to maintain the housing bodies 14, 15 of each of the housings 11, 12 in assembled snap-secured relationship while allowing the same to be readily disassembled from each other.

The housing bodies 14 also include integral means 45 in the form of brackets having openings 46 through which fasteners F (FIG. 4) can be inserted to secure each of the housing bodies 14 to opposite walls W (FIG. 1) to maintain the shelf 10 supported within the compartment C of the refrigerator R.

The length of the housing bodies 14 are also slightly longer than the length of the housing bodies 15 and include openable axial frusto-pyramidal tubular portions 47 which are opposite closed ends (unnumbered). Open ends 49 of each of the frusto-pyramidal portions 47 are closed by removable caps 48 which can be snapped-secured to the frusto-pyramidal portions 47 and carry internally thereof illuminating means 50 (FIG. 4) in the form of a conventional LED and associated circuitry which are connected by electrical conductors 51, 52 to a 12 volt source of energy, such as a step-down transformer (not shown). Prior to snap-securing the caps 48 to the frusto-pyramidal portions 47, means 55 in the form of a light tube made of transparent acrylic synthetic plastic material having a plurality of light-focusing facets 56 (FIGS. 2 through 4) spaced along the length thereof is inserted in each of the chambers 16 of the housings 11, 12 such that the light-directing facets 56 direct the light created by the LED 50 through the light tube 55 along the entire length thereof and into the terminal free edge 35 of each of the edge portions 33, 34 of the light-transmitting panel 13 thereby illuminating the panel and objects supported thereupon as well as products, areas and spaces located therebelow and thereabove.

Should at any time a problem develop with the light tubes 55 or the LED's 50, the fasteners F along either housing 11, 12 can be removed, the shelf 10 can then be inclined upwardly or downwardly, and the entire housing 11 or 12 can be slipped and removed from either edge portion 33, 34 after which the entire panel 13 can be removed from the slot 20 of the remaining housing 11 or 12. The cap 48 of the removed housing can be removed from the frusto-pyramidal portion 47 and the LED 50 and/or associated circuitry can be repaired or replaced and the components thereafter reassembled. The same disassembly can be utilized for removing and replacing the light tube 55 should such be found necessary or desirable. Therefore, both the ease of assembly and disassembly of the housing bodies 14, 15 of each of the housings 11, 12 relative to each other and to the glass panel 13 and the similar ease of assembly and disassembly of the caps 48 with respect to the frusto-pyramidal portions 47 of the housings 11, 12 assure that the shelf 10 will at all times generate intended light values during the lifetime of the shelf 10 and the associated refrigerator R.

Figure 5:
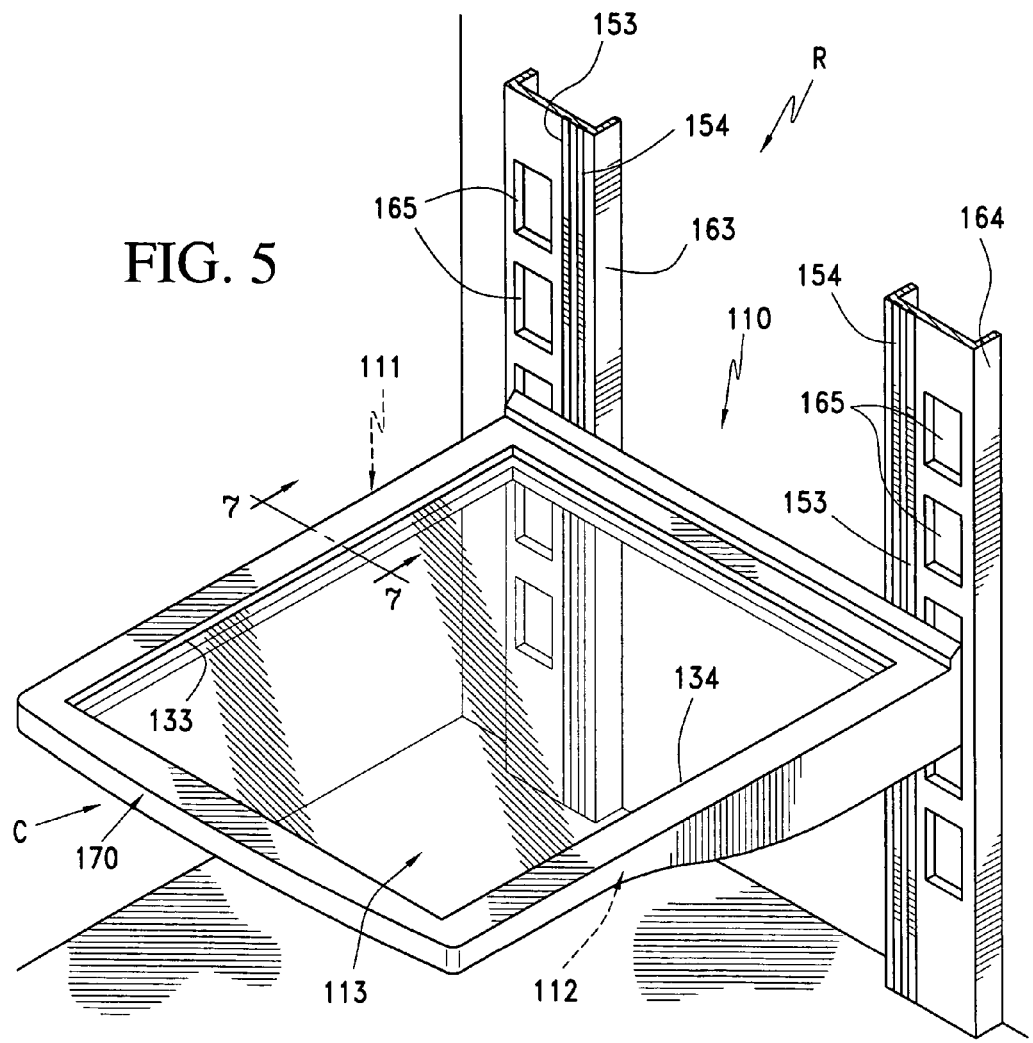
FIG. 5 is a fragmentary perspective view of another illumination device in the form of a shelf, and illustrates the latter associated with slotted tracks in a compartment of a refrigerator.
Figure 6:
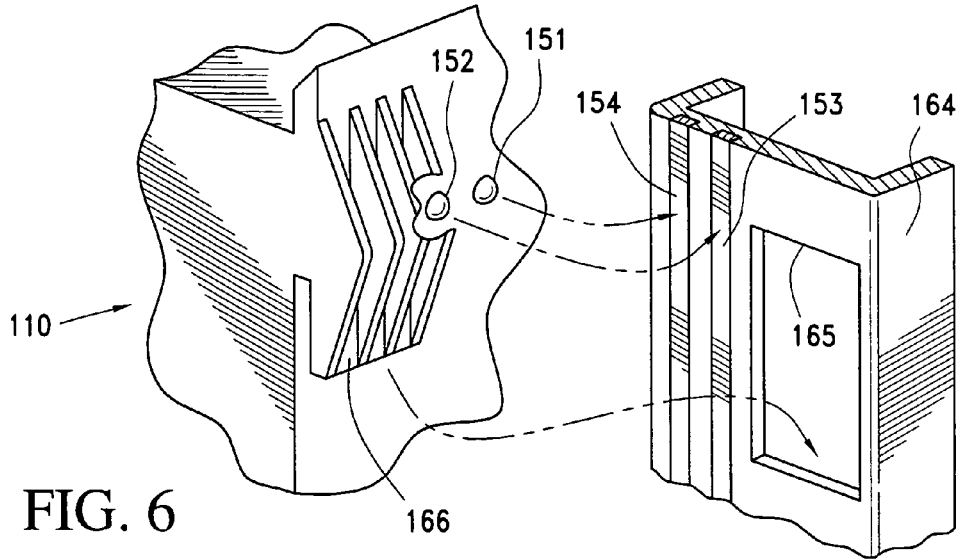
FIG. 6 is an enlarged fragmentary perspective view, and illustrates electrical conductors and hooks and slots of the shelf and one of the tracks for providing electrical current to illuminating devices associated with the shelf and vertical adjustment of the latter relative to the tracks.
Figure 7:
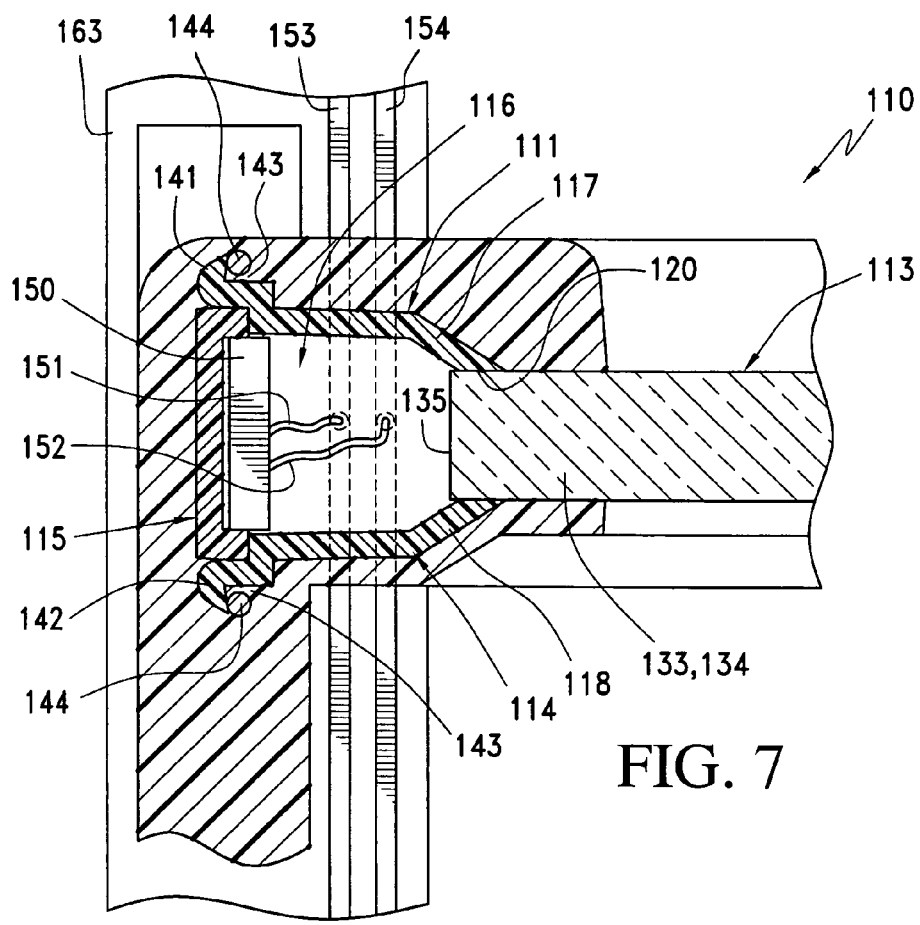
FIG. 7 is an enlarged fragmentary cross-sectional view taken generally along line 7-7 of FIG. 5, and illustrates details of the electrical conductors, a snap-secured two part housing, and a continuous border in the form of an encapsulation entirely encapsulating the housing, the snap-connections thereof, and an edge portion of a tempered glass panel received in a slot of the housing exposed to an LED circuit within a chamber of the housing.

Another novel illumination device constructed in accordance with this invention, also in the form of a shelf, is illustrated in FIGS. 5 through 7 of the drawings, and is generally designated by the reference numeral 110.

The shelf 110 is preferably associated with a compartment C of a refrigerator R, as is best illustrated in FIG. 5 of the drawings. However, the shelf 110 can easily be utilized in other structures, such as retail store display cases, furniture cabinetry (dish display cases), utility shelves for workshops, wash rooms, etc. No matter the particular utilization of the shelves of this invention, each of the various shelves disclosed herein is designed to be illuminated directly or indirectly to thereby better illuminate articles or products supported upon, above or below the shelves to aid consumer selection thereof.

The shelf 110 includes two substantially identical housings 111, 112 which are substantially identical to the respective housings 11, 12 and which house therebetween a plate, panel or member of light-transmitting material, such as tempered glass, which is designated by the reference numeral 113. All components of the shelf 110 which are identical to the components of the shelf 10 will be identically numbered though prefixed with "1__."

Each housing 111, 112 includes adjacent, inboard opposing housing bodies, members or parts 114, 114 and remote complementary housing bodies, members or parts 115, 115. The housing bodies 114, 114; 115, 115 of each of the housings 111, 112 cooperatively define an internal chamber 116 (FIG. 7) which over a major portion thereof is of a generally uniform polygonal or square configuration which merges through upper and lower walls 117, 118 with an elongated slot or opening 120 in which is slidably housed an elongated side edge or side edge portion 133, 134 of the glass panel 113 with a terminal end edge 135 (FIG. 7) of the panel 113 being fully exposed to the interior of the chamber 116.

The housing bodies 114 of each of the housings 111, 112 include four pair of upwardly and downwardly directed hooks 141, 142, respectively, which removably snappingly secure into respective openings 143 and cross bars 144 (FIG. 7) of the outermost housing bodies 115 to maintain the housing bodies 114, 115 of each of the housings 111, 112 in assembled snap-secured relationship The housings 111, 112 are devoid of a light tube, such as the light tube 55, and instead carry internally thereof illuminating means 150 (FIG. 7) in the form of one or more conventional LED's and associated circuitry which are connected by electrical conductors 151, 152 and respective conductive strips 153, 154 of tracks 163, 164, respectively, to a 12 volt source of energy, such as a step-down transformer (not shown). Each track 163, 164 has slots 165 for receiving hooks 166 of an encapsulation or border 170 of plastic material which completely encapsulates the housings 111, 112 and the edges 133, 134 of the transparent tempered glass panel 113. Tapered walls 117, 118 of the housings 111, 112 direct the light created by the LED's 150 through the slots 120 along the entire length thereof and into the terminal free edge 135 of each of the edge portions 133, 134 of the light-transmitting panel 113 thereby illuminating the panel and objects supported thereupon, as well as the products, areas and spaces located therebelow and thereabove. It should be particularly noted that the conductors 151, 152 will be in electrical contact with the respective conductive strips 153, 154 irrespective of the particular slots 165 which are engaged by the hooks 166. Therefore, by raising and lowering the shelf 110, the compartment C of the refrigerator R can be selectively and/or proportionately illuminated.

Figure 8:
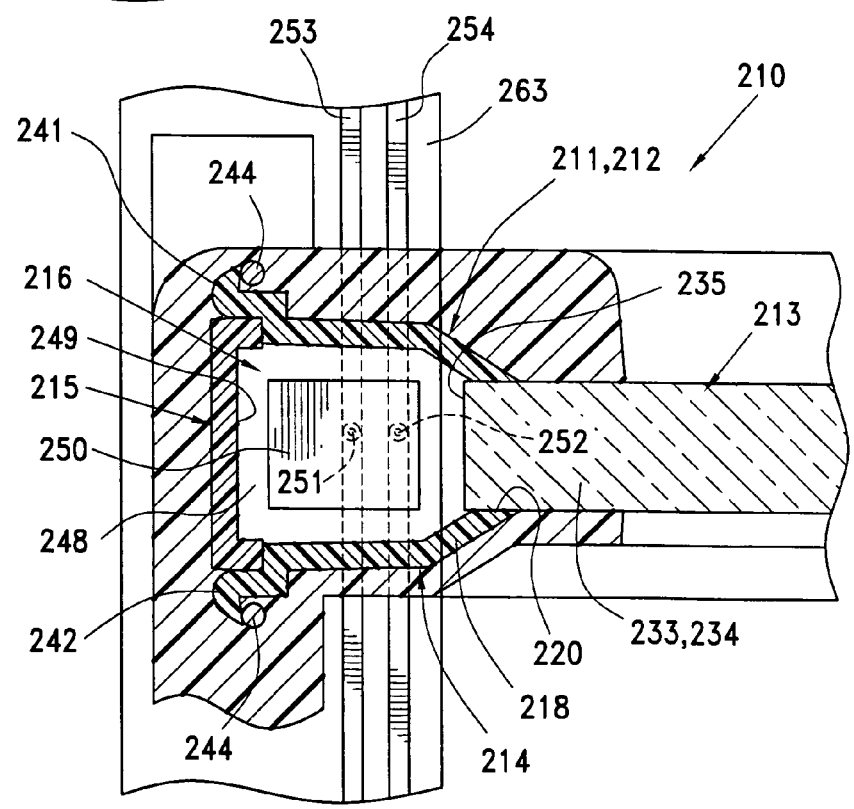
FIG. 8 is a fragmentary cross-sectional view of another illuminated shelf similar to FIG. 7, but illustrates a non-encapsulated axial end wall of the housing carrying an LED and its circuit to effect axial access to the housing chamber for repairs.

Another novel illumination device constructed in accordance with this invention in the form of a shelf is illustrated in FIG. 8 of the drawings, and is generally designated by the reference numeral 210.

The shelf 210 is substantially identical to the shelf 110 and like components have been identically numbered though prefixed with "2__."

The only difference between the shelves 110, 210 is that an axial end opening 249 of each chamber 216 of each housing 211, 212 of the shelf 210 is not encapsulated by the encapsulation and a cap 248 closing each opening 249 can be removed therefrom for purposes of repair should, for example, LED's 250 and/or the circuit thereof become inoperative.

Figure 9:
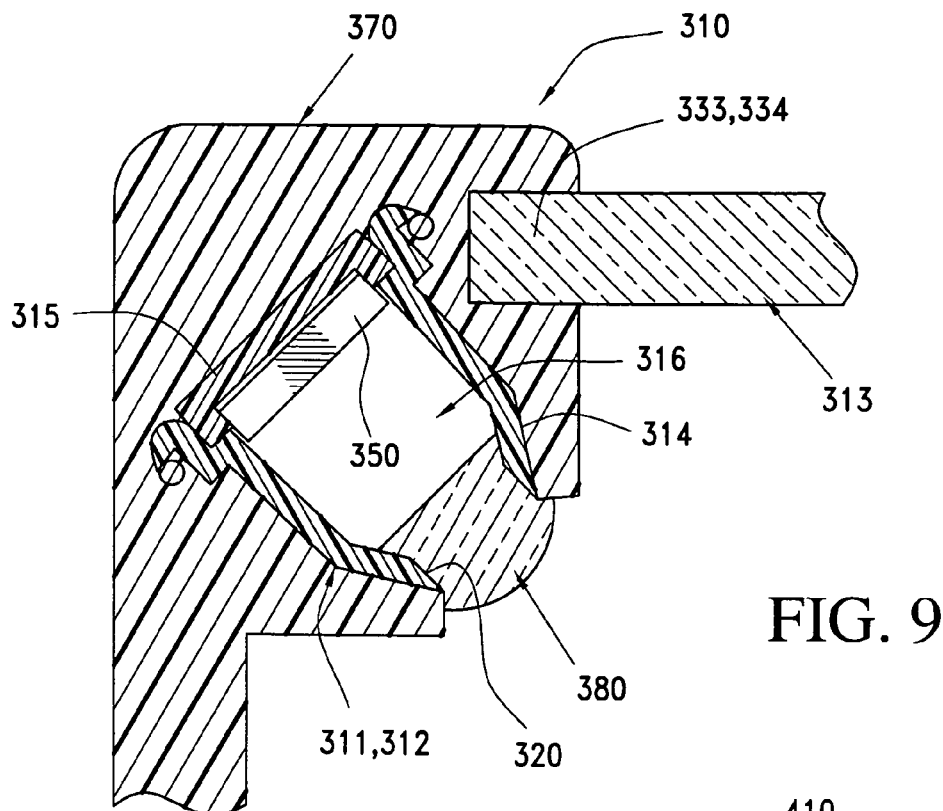
FIG. 9 is a fragmentary cross-sectional view of another illuminated shelf similar to FIG. 7, and illustrates a chamber defined by the housing in which an LED and its circuit emit light through a lens directed away from a light transmitting glass panel encapsulated to the housing.

Another novel illumination device in the form of a shelf is illustrated in FIG. 9 of the drawings, and is generally designated by the reference numeral 310.

The shelf 310 is substantially identical to the shelf 110 and like components have been identically numbered though prefixed with "3__."

The shelf 310 differs from the shelf 110 in two major aspects, namely, edges 333, 334 of a transparent tempered glass panel 313 are not received in an elongated slot 320 of each of the housing bodies 314, 315, but are instead completely peripherally encapsulated by an encapsulation 370, and an elongated lens 380 is housed in the slot 320. Each of the housings 311, 312 is angled downwardly so that light emitted from LED's 350 is directed downwardly and only light reflected from areas beneath the tempered glass panel 313 will be directed upwardly therethrough to illuminate products resting thereupon and/or spaces thereabove. However, downward reorientation of the housings 310, 311 affords maximum downward illumination while at the same time providing lesser though acceptable illumination above the tempered glass panel 313.

Figure 10:
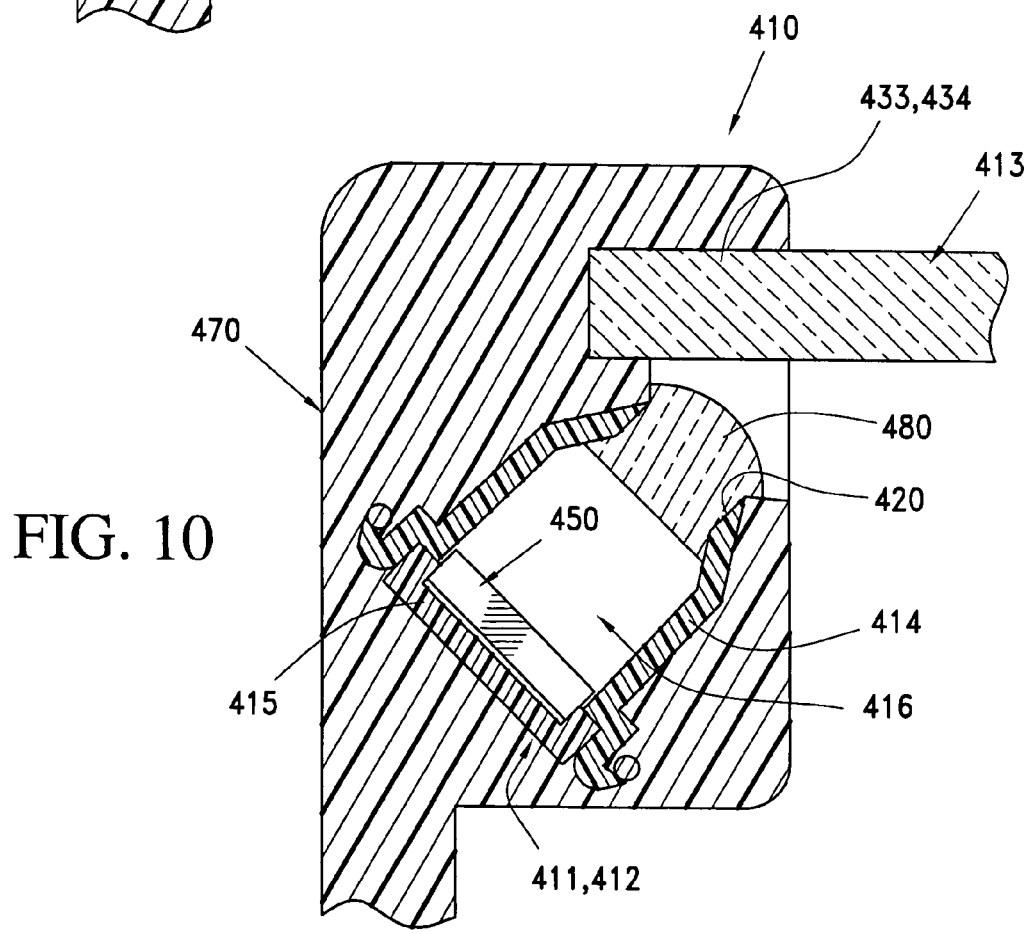
FIG. 10 is a fragmentary perspective view of another illuminated shelf similar to FIG. 9, and illustrates an LED and its circuit housed in a chamber of the housing in association with one or more lens for emitting light toward and through a lower surface of an associated light-transmitting tempered glass panel.

Another shelf 410 illustrated in FIG. 10 of the drawings is substantially identical to the shelf 310 just described and like components have been identically numbered though prefixed with "4__."

The major difference between the shelves 310, 410 is that the housings 411, 412 are oriented to direct light upwardly through each of the lens 480 toward, through and reflected downwardly from the transparent tempered glass panel 413. Thus, objects resting upon the tempered glass panel 413 are afforded significantly more illumination by the shelf 410 than by the shelf 310. However, light reflected downwardly from the tempered glass panel 413 adequately provides illumination to spaces/products therebelow.

Figure 11:
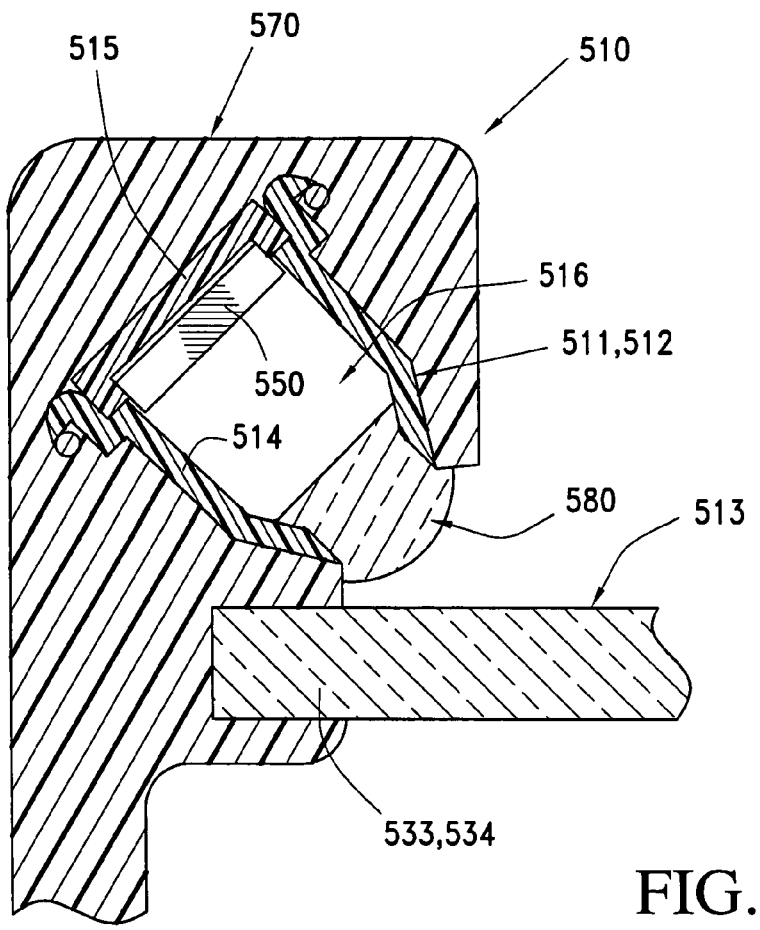
FIG. 11 is a fragmentary cross-sectional view similar to FIG. 10, and illustrates another LED and its circuitry generating light transmitted through one or more lens toward and through a top surface of an associated light-transmitting tempered glass panel.

A shelf 510 of FIG. 11 is substantially identical to the shelf 410 of FIG. 10 and like components have been identically numbered though prefixed with "5__."

The only difference between the shelves 410, 510 is the positioning of each of the housings 511, 512 above the tempered glass panel 513 to direct light downwardly through the lenses 580, as opposed to the upward direction of light rays through the lenses 480 of the shelf 410.

Figure 12:
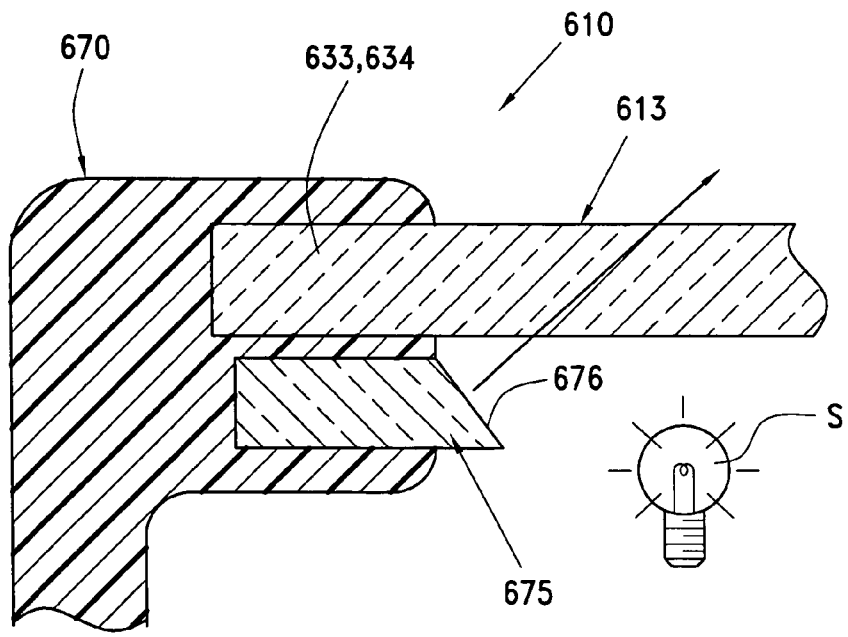
FIG. 12 is a fragmentary cross-sectional view similar to FIG. 11, and illustrates an encapsulation completely peripherally bordering an edge of a light-transmitting tempered piece of glass along each of opposite sides thereof, only one of which is shown, and a light-transmitting and reflecting member for illuminating the tempered glass panel from an interior light source disassociated from the illuminated shelf.

Another shelf constructed in accordance with this invention is illustrated in FIG. 12 of the drawings and is generally designated by the reference numeral 610. Like components of the shelf 610 which correspond to those components heretofore described have been identically numbered though prefixed with "6__."

The major difference between the shelf 610 and the shelves earlier described herein is that the shelf 610 excludes a source of illumination. Instead the shelf 610 includes an encapsulation or border 670 corresponding to the encapsulation or border 170 which completely encapsulates the entire peripheral edge, including the edges 633, 634 of the transparent tempered glass panel 613. In addition, the encapsulation 670 encapsulates a strip or member 675 of transparent material, such as tempered glass having an angled surface 676 for directing light from a light source S. such as a conventional bulb in a refrigerator compartment, upwardly through the tempered glass panel 613. The surface 676 might be mirrored to increase direct reflection of light impinging thereon from the light source S. Furthermore, the strip member 676 can be located along only the side edges 633, 634 of the tempered glass panel 613 or also along either or both of the rear portions (not shown) of the encapsulation 670.

Another novel illumination device constructed in accordance with this invention, also in the form of a shelf, is illustrated in FIGS. 13 and 14 of the drawings, and is generally designated by the reference numeral 710.

The shelf 710 is substantially identical to the shelves heretofore described, particularly the shelf 110 of FIGS. 5 through 7, with like components being identically numbered though prefixed with "7__."

The only difference between the shelves 110 and 710 is that the shelf 710 includes separate metallic shelf brackets B carry hooks (not shown) for engaging slots 765 of tracks 763, 764.

Figure 15:
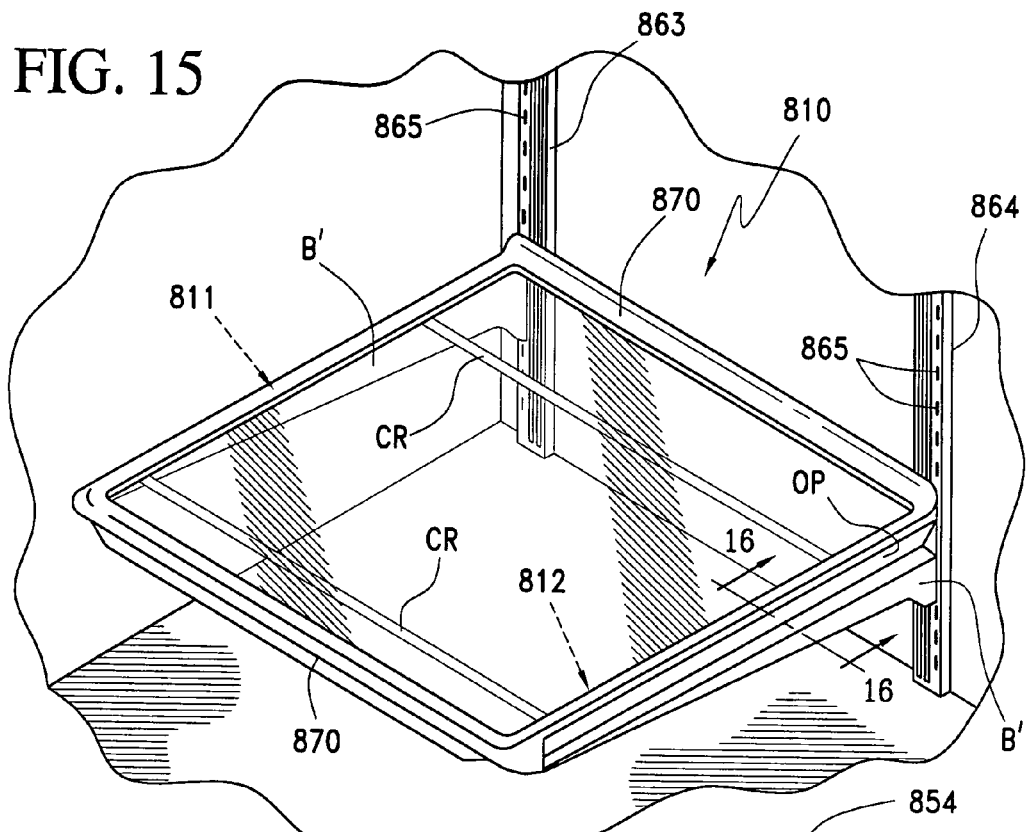
FIG. 15 is a fragmentary perspective view of a slidable illuminated shelf, and illustrates the slidable shelf associated with electrically conductive strips of a cantilevered shelf bracket and vertical tracks of a refrigerator compartment.
Figure 16:
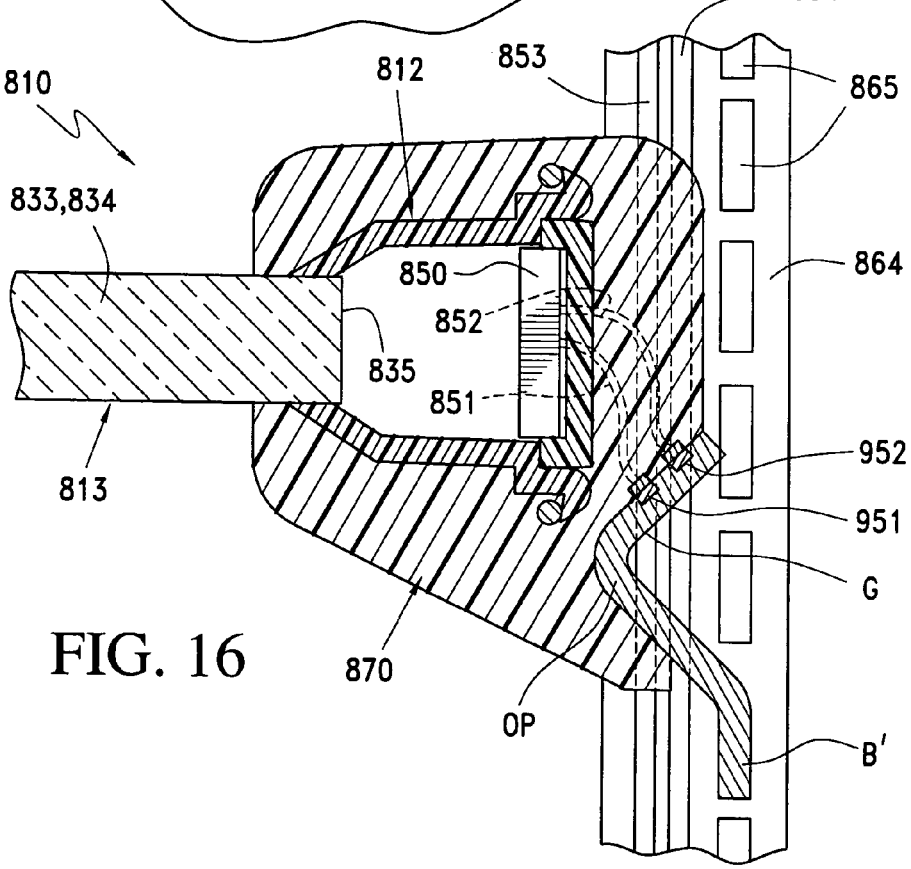
FIG. 16 is an enlarged cross-sectional view taken generally along line 16-16 of FIG. 15, and illustrates the manner in which the shelf is mounted in sliding relationship to one of opposite cantilevered shelf brackets and electrical conductors forming part of the sliding connection to provide electric current no matter the position of the slidable shelf relative to the shelf brackets.

A final shelf constructed in accordance with this invention is generally designated by the reference numeral 810 (FIGS. 15 and 16) which is constructed as an illuminated sliding shelf which can slide along metal or plastic cantilevered shelf brackets B', B' which are rigidly joined to each other by cross rods CR and carry hooks (not shown) which engage in conventional slots 865 of tracks 863, 864. Housings 811, 812 carry internally thereof illuminating means 850 (FIG. 16) in the form of one or more conventional LED's and associated circuitry which are connected by electrical conductors 851, 852 to a 12 volt source of energy, such as a step-down transformer (not shown). However, the conductors 851, 852 are not directly in contact with respective conductive strips 853, 854 of respective tracks 863, 864, but instead are in contact with respective conductive strips 951, 952 carried by an upper surface (unnumbered) of an offset portion OP of each of the brackets B' which is in sliding relationship with an elongated convexly outwardly opening groove G of the encapsulation 870. If the brackets B' are constructed from plastic material, the conductive strips 951, 952 are merely embedded therein and are in sliding contact with the respective conductors 851, 852 with ends of the conductive strips 951, 952 engaging the respective conductive strips 853, 854 of the respective tracks 863, 864. However, if the brackets B' are constructed from metallic material, the conductive strips 951, 952 must be conventionally electrically insulated therefrom. However, no matter to what position the shelf 810 is slid relative to the brackets B', electrical contact is maintained and the tempered glass panel 813 is illuminated through opposite side edges 835 thereof.

Although a preferred embodiment of the invention has been specifically illustrated and described herein, it is to be understood that minor variations may be made in the apparatus without departing from the spirit and scope of the invention, as defined by the appended claims.

What is claimed is:

1. A shelf comprising a product support adapted to be disposed substantially horizontally in an associated compartment whereby products can be supported thereon, means for effecting selective vertical adjustable support of said product support relative to a wall portion of an associated compartment, means for effecting horizontal sliding movement of said product support relative to said vertical adjustable support means, means carried by said product support for creating illumination, first means defined at least in part by said product support for receiving electrical current from an electrical current source, and second means for defining a sliding electrical contact between said electrical current receiving means and said illumination creating means whereby illumination is created at substantially any position of horizontal sliding movement of said product support relative to said vertical adjustable support means.

2. The shelf as defined in claim 1 wherein said product support includes a support panel, said vertical adjustable support means includes at least one shelf bracket having means for selectively vertically adjusting said at least one shelf bracket relative to a wall portion of an associated compartment, said support panel having a border along at least one edge portion of said support panel, and said second sliding electrical contact means is defined by electrical contacts carried by each of said border and shelf bracket in sliding contact with each other.

3. The shelf as defined in claim 2 wherein said support panel is substantially transparent.

4. The shelf as defined in claim 2 wherein said illumination means directs illumination into an edge portion of said support panel.

5. The shelf as defined in claim 2 wherein said illumination means directs illumination into said support panel through one of two opposite upper and lower surfaces.

6. The shelf as defined in claim 2 wherein said electrical contacts include at least a pair of elongated conductors.

7. The shelf as defined in claim 2 wherein said border is a polymeric/copolymeric in situ encapsulation at said at least one edge portion of said support panel.

8. The shelf as defined in claim 2 wherein said border is a polymeric/copolymeric in situ encapsulation at said at least one edge portion of said support panel, and said border electrical contacts are at least in part in situ encapsulated by said in situ encapsulation.

9. The shelf as defined in claim 2 wherein said electrical contacts include at least a pair of elongated conductors disposed in substantially parallel relationship to each other.

10. The shelf as defined in claim 2 wherein said electrical contacts include at least a pair of elongated conductors disposed in substantially parallel relationship to each other along said shelf bracket.

11. The shelf as defined in claim 3 wherein said electrical contacts include at least a pair of elongated conductors.

12. The shelf as defined in claim 11 wherein said border is a polymeric/copolymeric in situ encapsulation at said at least one edge portion of said support panel.

13. The shelf as defined in claim 11 wherein said border is a polymeric/copolymeric in situ encapsulation at said at least one edge portion of said support panel, and said border electrical contacts are at least in part in situ encapsulated by said in situ encapsulation.

14. The shelf as defined in claim 11 wherein said electrical contacts include at least a pair of elongated conductors disposed in substantially parallel relationship to each other.

15. The shelf as defined in claim 1 wherein said product support includes a support panel, said vertical adjustable support means includes a pair of shelf brackets each having means for selectively vertically adjusting said pair of shelf brackets relative to a wall portion of an associated compartment, said support panel having a border along at least each of two opposite side edge portions of said support panel, and said second sliding electrical contact means are defined by electrical contacts carried by at least one of said borders and one of said shelf brackets in sliding contact with each other.

16. The shelf as defined in claim 15 wherein said support panel is substantially transparent.

17. The shelf as defined in claim 15 wherein said electrical contacts include at least a pair of elongated conductors.

18. The shelf as defined in claim 15 wherein each border is a polymeric/copolymeric in situ encapsulation at each of said two opposite side edge portions of said panel.

19. The shelf as defined in claim 16 wherein each border is a polymeric/copolymeric in situ encapsulation at each of said two opposite side edge portions of said panel.

20. The shelf as defined in claim 18 wherein said electrical contacts include at least a pair of elongated conductors.

\* \* \* \* \*